(12) United States Patent
Toko

(10) Patent No.: US 10,155,470 B2
(45) Date of Patent: Dec. 18, 2018

(54) VEHICLE LIGHTING DEVICE

(71) Applicant: STANLEY ELECTRIC CO., LTD., Meguro-ku, Tokyo (JP)

(72) Inventor: Yasuo Toko, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 465 days.

(21) Appl. No.: 14/936,541

(22) Filed: Nov. 9, 2015

(65) Prior Publication Data
US 2016/0144769 A1    May 26, 2016

(30) Foreign Application Priority Data

Nov. 25, 2014   (JP) .................................. 2014-237441

(51) Int. Cl.
| | | |
|---|---|---|
| *B60Q 1/076* | (2006.01) | |
| *F21V 7/22* | (2018.01) | |
| *G02F 1/15* | (2006.01) | |
| *F21S 41/147* | (2018.01) | |
| *F21S 41/32* | (2018.01) | |

(Continued)

(52) U.S. Cl.
CPC ............ *B60Q 1/076* (2013.01); *F21S 41/147* (2018.01); *F21S 41/321* (2018.01); *F21S 41/36* (2018.01); *F21S 41/645* (2018.01); *F21S 41/67* (2018.01); *F21V 7/22* (2013.01); *G02F 1/1506* (2013.01)

(58) Field of Classification Search
CPC ...... B60Q 1/076; F21S 41/141; F21S 41/143; F21S 41/147; F21S 41/365; F21S 41/64; F21S 41/645; F21S 41/67
See application file for complete search history.

(56) References Cited

U.S. PATENT DOCUMENTS

| | | |
|---|---|---|
| 5,424,927 A | 6/1995 | Schaller et al. |
| 6,045,725 A | 4/2000 | Udaka et al. |

(Continued)

FOREIGN PATENT DOCUMENTS

| | | |
|---|---|---|
| JP | H10133236 A | 5/1998 |
| JP | 2005183327 A | 7/2005 |

(Continued)

OTHER PUBLICATIONS

Extended European Search Report dated Sep. 16, 2016, issued in counterpart European Application No. 15195959.

(Continued)

*Primary Examiner* — Leah S Macchiarolo
(74) *Attorney, Agent, or Firm* — Holtz, Holtz & Volek PC

(57) ABSTRACT

A vehicle lighting device comprising a light source, a mirror member disposed on an optical axis of the light source, and a first optical element disposed on the optical axis of the light source between the light source and the mirror member, including a first region allowed to be switched between a light transmitting state and a light reflecting state and a second region having at least a light reflecting state, wherein the first region is capable of reflecting part of the light emitted from the light source to a relatively remote place, the second region is capable of reflecting part of the light emitted from the light source to a relatively near place, and the mirror member is capable of reflecting the light that is emitted from the light source and then passes through the first region to a relatively near place.

12 Claims, 12 Drawing Sheets

(51) Int. Cl.
*F21S 41/36* (2018.01)
*F21S 41/64* (2018.01)
*F21S 41/67* (2018.01)

(56) References Cited

U.S. PATENT DOCUMENTS

| | | |
|---|---|---|
| 6,425,684 B1 | 7/2002 | Kranzler et al. |
| 2011/0305029 A1 | 12/2011 | Chuang et al. |
| 2012/0287493 A1* | 11/2012 | Kuhlman ............... B60Q 1/085 359/228 |
| 2014/0071704 A1* | 3/2014 | Yagi ..................... F21S 41/645 362/516 |

FOREIGN PATENT DOCUMENTS

| | | | |
|---|---|---|---|
| JP | 2008120162 A | 5/2008 | |
| JP | 2010176981 A | 8/2010 | |
| JP | 2012009435 A | 1/2012 | |
| JP | 2012094332 A | 5/2012 | |
| JP | 2012181389 A | 9/2012 | |
| JP | 2014072040 A | 4/2014 | |

OTHER PUBLICATIONS

Japanese Office Action dated Aug. 7, 2018 (and English translation thereof) issued in counterpart Japanese Application No. 2014-237441.

\* cited by examiner

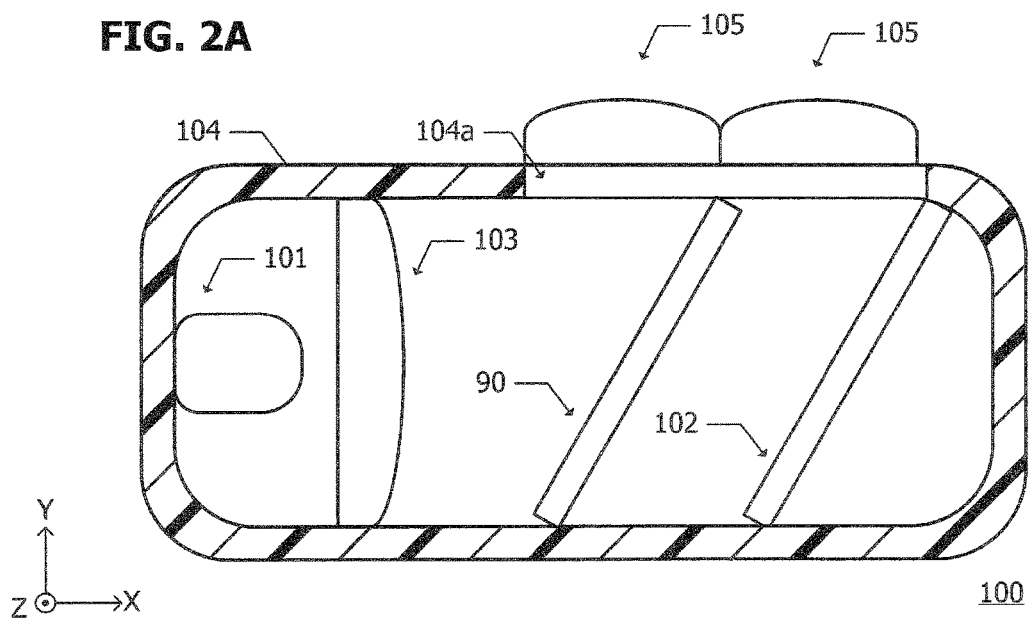
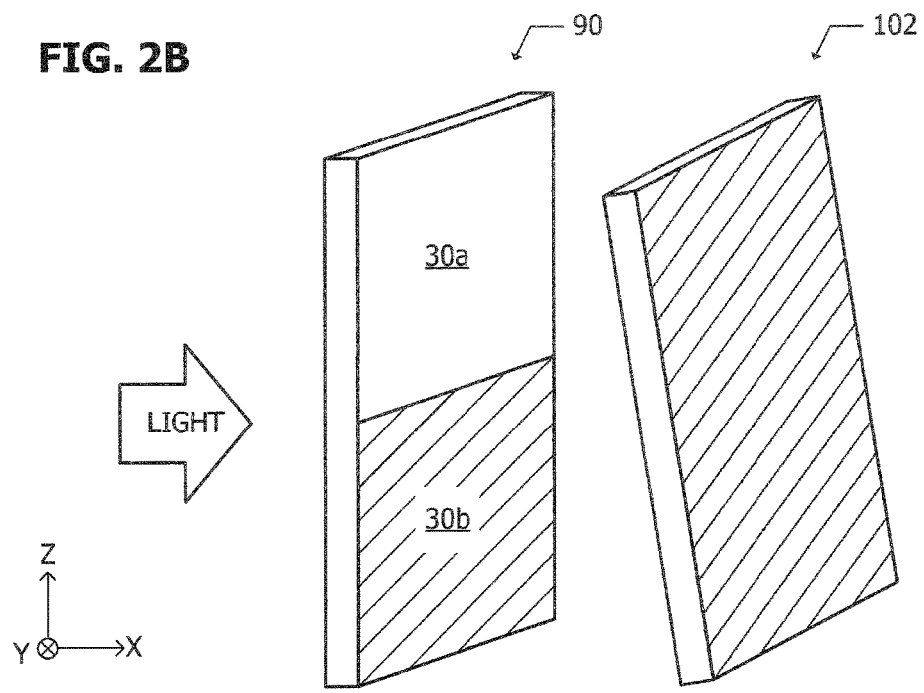

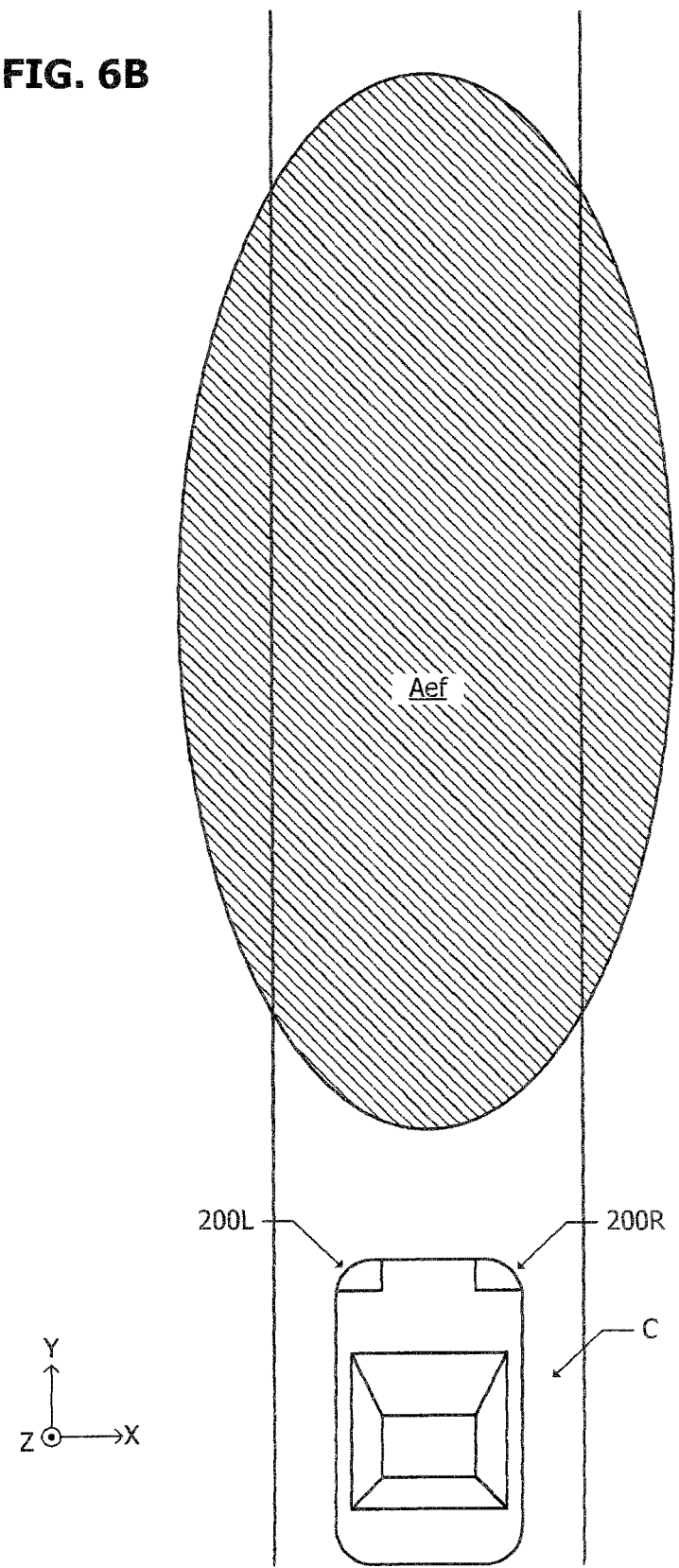

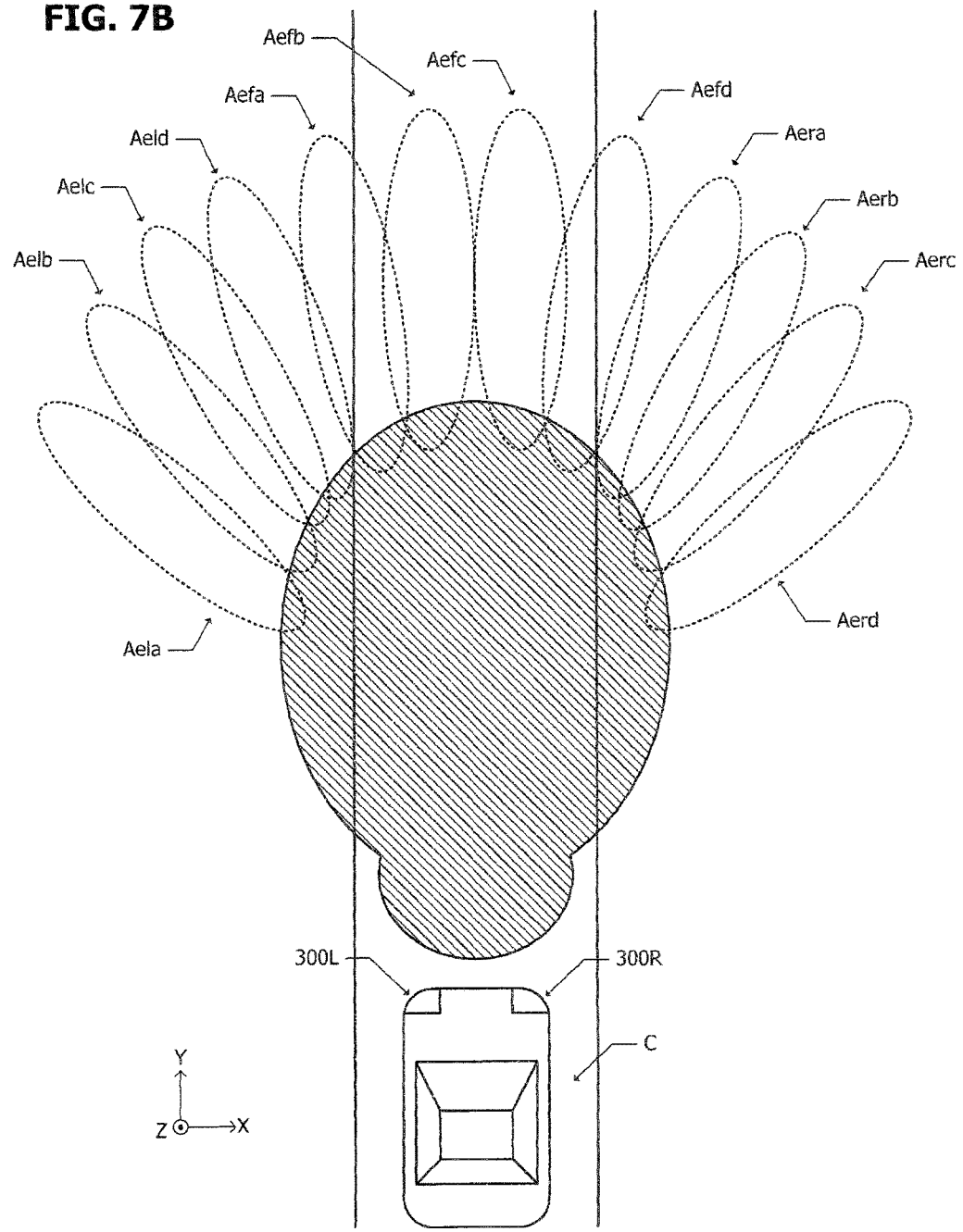

VEHICLE LIGHTING DEVICE

CROSS REFERENCE TO RELATED APPLICATION

This application is based on and claims priority on Japanese Patent Application 2014-237441, filed on Nov. 25, 2014, the entire contents of which are incorporated herein by reference.

FIELD OF THE INVENTION

The present invention relates to a vehicle lighting device that uses an electrodeposition element.

BACKGROUND

Japanese Laid-Open Patent Publication No. 2012-181389 discloses a so-called electrodeposition element. The electrodeposition element mainly includes a pair of electrodes facing each other and an electrolyte layer held between the pair of electrodes and containing an electrodeposition material including silver.

In a steady state (when no voltage is applied), the electrolyte layer is substantially transparent and the electrodeposition element is in a transparent state. When a voltage is applied across the pair of electrodes, due to oxidation-reduction reaction, the electrodeposition material (silver) in the electrolyte layer is deposited and accumulated on one of the electrodes. This causes the electrodeposition element to be in a mirror (highly optically reflective) state.

Japanese Laid-open Patent Publication No. 2008-120162 discloses a vehicle lighting device for adjusting a light emitting direction or light illumination area by mechanically controlling an optical member. Japanese Laid-open Patent Publication No. 2005-183327 discloses a vehicle lighting device that uses a liquid crystal element.

SUMMARY

An object of this invention is to provide a vehicle lighting device that uses an electrodeposition element.

According to an aspect of this invention, there is provided a vehicle lighting device comprising a light source for emitting light in a predetermined direction, a mirror member disposed on an optical axis of the light source so as to be inclined to the optical axis, and a first optical element disposed on the optical axis of the light source between the light source and the mirror member so as to be inclined to the optical axis, the first optical element including a first region allowed to be switched between a light transmitting state and a light reflecting state and a second region having at least a light reflecting state, wherein the first region in the first optical element is capable of reflecting part of the light emitted from the light source to a relatively remote place, the second region in the first optical element is capable of reflecting part of the light emitted from the light source to a relatively near place, and the mirror member is capable of reflecting the light that is emitted from the light source and then passes through the first region in the first optical element to a relatively near place.

The object and advantages of the invention will be realized and attained by means of the elements and combinations particularly pointed out in the claims.

It is to be understood that both the foregoing general description and the following detailed description are exemplary and are not restrictive of the invention, as claimed.

BRIEF DESCRIPTION OF THE DRAWINGS

FIG. 2A is a schematic diagram that illustrates a basic structure of a vehicle lighting device including the electrodeposition element, and FIG. 2B is a schematic diagram that illustrates a placement state of the electrodeposition element and so forth.

FIGS. 6A to 6C are schematic diagrams that illustrate light distribution states of a headlight using the vehicle lighting device according to the embodiment.

FIG. 7B is a schematic diagram that illustrates a light distribution state of a headlight using a vehicle lighting device including the electrodeposition element.

DESCRIPTION OF THE PREFERRED EMBODIMENTS

Figure 1A:
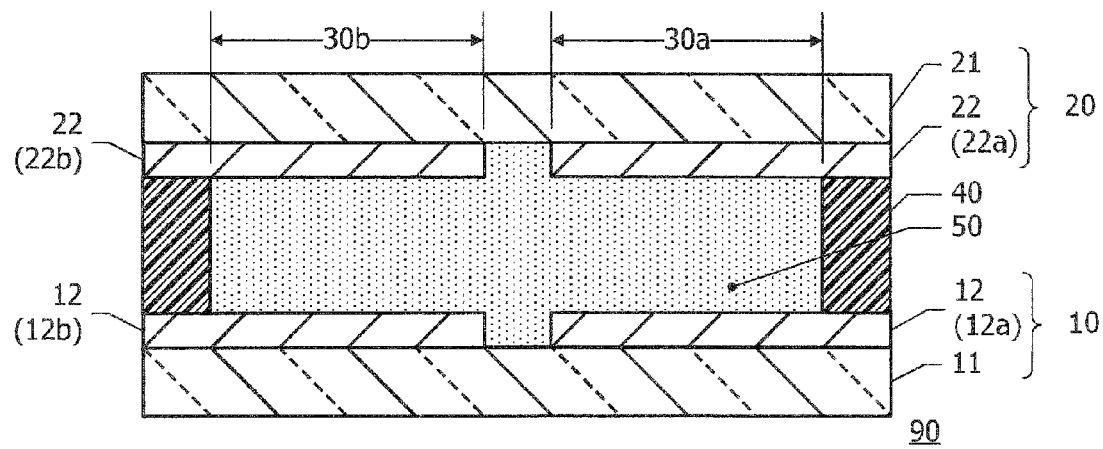
FIGS. 1A and 1B are a cross-sectional view and a plan view, respectively, that illustrate an electrodeposition element according to an embodiment.
Figure 1B:
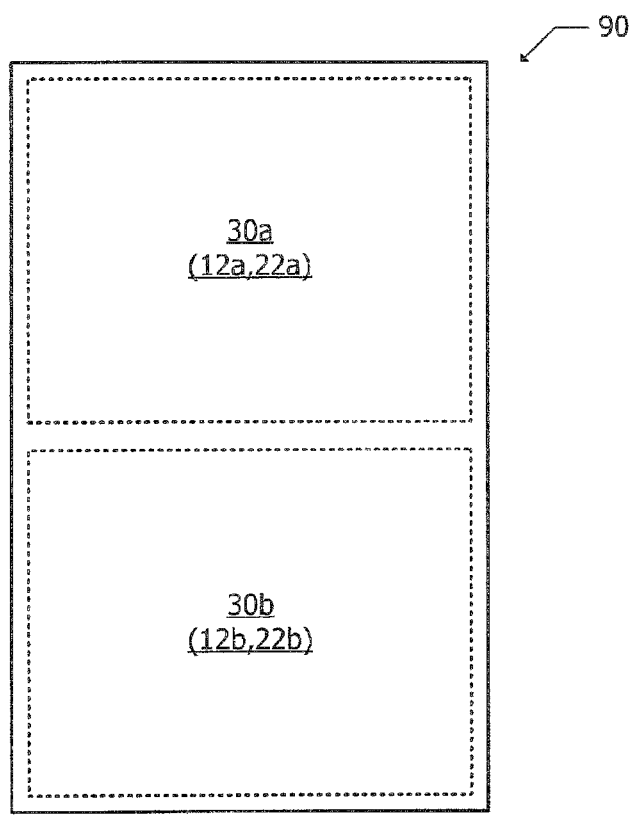

FIGS. 1A and 1B are a cross-sectional view and a plan view, respectively, that illustrate an electrodeposition element (ED element) 90 according to an embodiment. A method for producing the ED element 90 is described below with reference to FIG. 1A.

First, two transparent substrates each including a base substrate having a surface with an electrode formed thereon are prepared. If needed, the electrode on the surface of the base substrate may be subjected to patterning such that it has a desired planar shape by etching, laser ablation, or other similar technique.

The base substrate is a light transmitting substrate. Examples of a substrate used as the base substrate may be a plate substrate, such as a blue plate glass, and a film substrate, such as one made of polycarbonate. Examples of a member used in the electrode may include a conductive and light-transmitting member, such as the indium tin oxide (ITO) or indium zinc oxide (IZO).

Of the prepared two transparent substrate, one is set as a lower substrate 10, and the other is set as an upper substrate 20. The base substrate and electrode in the lower substrate 10 are referred to as a lower base substrate 11 and a lower electrode 12 (12a, 12b), respectively. The base substrate and electrode in the upper substrate 20 are referred to as an upper base substrate 21 and an upper electrode 22 (22a, 22b).

Next, a seal frame member 40 is formed on the lower or upper substrate 10 or 20 (surface of the lower or upper electrode 12 or 22), for example, the lower substrate 10. One example of the entire planar shape of the seal frame member 40 is a rectangular frame shape. One example of the material of the seal frame member 40 is ultraviolet curable resin. The seal frame member 40 may also be made of thermosetting resin.

Subsequently, a gap control agent whose particle diameter is in the range of several tens of micrometers to several hundred micrometers, for example, 500 μm is sprayed on the lower or upper substrate 10 or 20 (surface of the lower or upper electrode 12 or 22), for example, the upper substrate 20. One example density of the gap control agent may be on the order of 1-3 particles/mm$^2$. Instead of sprinkling the gap control agent, columnar projections may be formed. The gap control agent may be sprayed on the substrate on which the seal frame member 40 is disposed, that is, the lower substrate 10.

Then, an electrolyte solution (electrolyte layer) 50 containing an electrodeposition (ED) material including silver is dripped inside the seal frame member 40 on the lower substrate 10 (surface of the lower electrode 12). The upper substrate 20 is attached to the lower substrate 10 with the electrolyte solution 50 dripped thereon such that the lower and upper electrodes 12 and 22 face each other. After that, the seal frame member 40 is illuminated by ultraviolet rays, and the seal frame member 40 is cured. In this way, the space surrounded by the lower and upper substrates 10 and 20 and the seal frame member 40 is filled with the electrolyte solution 50.

The electrolyte solution (electrolyte layer) 50 may include an ED material (e.g., silver nitrate (AgNO3)), electrolyte (e.g., tetrabutylammonium bromide (TBABr)), mediator (e.g., copper(II) chloride (CuCl2)), electrolyte purifier (e.g., lithium bromide (LiBr)), and a solvent (e.g., dimethyl sulfoxide (DMSO)). The electrolyte solution 50 may be gelatinized (jellied) by the addition of a gelling polymer (e.g., polyvinyl butyral (PVB)). In the embodiment, one in which 50 mM of AgNO3 as the ED material, 250 mM of LiBr as the supporting electrolyte, and 10 mM of CuCl2 as the mediator are dissolved in DMSO being the solution and 10 wt % of PVB is added as the gelling polymer was used.

Examples of the ED material, other than AgNO3, may include silver perchlorate (AgClO4) and silver bromide (AgBr). Here, the ED material is a material that is partly deposited and accumulated or disappears on the surface of the lower or upper electrode 12 or 22 due to oxidation-reduction reaction or other reaction.

The supporting electrolyte is any material that facilitates oxidation-reduction reaction or other reaction of the ED material. As the supporting electrolyte, lithium salt (e.g., lithium chloride (LiCl), Lithium bromide (LiBr), lithium iodide (LiI), lithium tetrafluoroborate (LiBF$_4$), lithium perchlorate (LiClO$_4$)), potassium salt (e.g., potassium chloride (KCl), potassium bromide (KBr), potassium iodide (KI)), or sodium salt (e.g., sodium chloride (NaCl), sodium bromide (NaBr), sodium iodide (NaI)) may suitably be used.

Examples of the mediator, other than CuCl$_2$, which contains copper, may include copper(II) sulfate (CuSO$_4$) and copper(II) bromide (CuBr$_2$), which contain copper. Here, the mediator is a material that is oxidized or reduced with an electrochemically lower energy than that for silver.

The solvent is any solvent that can stably support the ED material (and the other materials). Examples of the solvent may include a polar solvent, such as water or propylene carbonate, nonpolar organic solvent, ionic liquid, ion conductive polymer, and polymer electrolyte. Specifically, in addition to DMSO, propylene carbonate, N,N-dimethylformamide, tetrahydrofuran, acetonitrile, polyvinyl sulfate, polystyrene sulfonate, and polyacrylic acid may suitably be used.

The electrolyte solution may be dripped by using a dispenser, inkjet head, or other similar tool. The lower and upper substrates 10 and 20 may be attached in the atmosphere, a vacuum, or a nitrogen atmosphere.

In the above-described way, the ED element 90 is completed. The fundamental functions of the ED element 90 are described below.

In a steady state (when no voltage is applied), the electrolyte layer 50 is substantially transparent and the ED element 90 achieves a transparent state. In actuality, it may have a slight tinge of yellow. This may be caused by the effects of the mediator (CuCl$_2$). Such a tinge can be reduced by narrowing the gap between the lower and upper substrates 10 and 20 (thickness of the ED element 90).

For example, when the potential of the lower electrode 12 is used as a reference, in the case where a positive direct-current potential is applied to the upper electrode 22 (the order of 2.5 V is applied for several tens of seconds) (that is, in the case where a negative direct-current voltage is applied to the lower electrode 12), silver ions (ED material) in the electrolyte layer 50 are reduced on the surface of the lower electrode 12, and a silver thin film (highly reflective film) is deposited. This enables the ED element 90 to achieve a mirror state. When the potential of the lower electrode 12 is used as a reference, in the case where a negative direct-current potential is applied to the upper electrode 22 (that is, in the case where a negative direct-current voltage is applied to the upper electrode 22), a silver thin film (highly reflective film) is deposited on the surface of the upper electrode 22.

When the application of voltage to the lower and upper electrodes 12 and 22 stops, the silver (thin film) deposited on the surface of the lower electrode 12 dissolves in the electrolyte layer 50 as silver ions and disappears from the surface of the lower electrode 12. In this way, the ED element 90 achieves its transparent state again.

As illustrated in FIG. 1B, each of the lower and upper electrodes 12 and 22 may be divided into two optical property (light transmission/light reflection) switchable regions, for example. That is, the lower electrode 12 includes first and second lower electrodes 12*a* and 12*b*, and the upper electrode 22 includes first and second upper electrodes 22*a* and 22*b*. One of the lower electrode 12 and upper electrode 22 may be a solid electrode (electrode formed over the entire surface of the base substrate).

The first lower electrode 12*a* and the first upper electrode 22*a* face each other, and their overlapping region defines a first region 30*a* in the ED element 90. When a voltage is applied across the first lower electrode 12*a* and the first upper electrode 22*a*, the first region 30*a* in the ED element 90 is brought into a mirror state. When no voltage is applied across the first lower electrode 12*a* and the first upper electrode 22*a*, the first region 30*a* in the ED element 90 is in a transparent state.

The second lower electrode 12*b* and the second upper electrode 22*b* face each other, and their overlapping region defines a second region 30*b* in the ED element 90. When a voltage is applied across the second lower electrode 12*b* and the second upper electrode 22*b*, the second region 30*b* in the ED element 90 is brought into a mirror state. When no voltage is applied across the second lower electrode 12*b* and the second upper electrode 22*b*, the second region 30*b* in the ED element 90 is in a transparent state.

The planer size of each of the first and second regions 30*a* and 30*b* is on the order of 40 mm in a horizontal direction (left-and-right direction in FIG. 1B) and on the order of 25 mm in a vertical direction (up-and-down direction). The gap between them is on the order of 0.1 mm.

The structure and fundamental functions of the vehicle lighting device using the ED element, specifically, headlight are described below. For the sake of convenience, an xyz Cartesian coordinate system is defined. The x- and y-axes define a horizontal plane. The z-axis indicates a vertical (height) direction. In the following description, the positive y-axis direction is also referred to as forward or front direction, negative y-axis direction is also referred to as backward or rear direction. The positive x-axis direction is also referred to as right direction, and the negative x-axis direction is also referred to as left direction. The positive z-axis direction is also referred to as upper side, and the negative z-axis direction is also referred to as lower side.

FIG. 2A is a schematic diagram that illustrates the structure of a vehicle lighting device 100 according to a first embodiment (xy-plane). The vehicle lighting device 100 mainly includes the ED element 90, a light source 101, and a mirror member (mirror) 102. The ED element 90 has substantially the same structure as that of the ED element illustrated in FIGS. 1A and 1B.

The light source 101 may include a semiconductor light emitting device (LED), for example, and emits visible light (white light) in the positive x-axis direction. An optical member, such as a projection lens 103, may be disposed, for example, in the vicinity of the light source 101 on the optical axis of the light source 101. One example of the optical member may be a collimator lens, which forms light from the light source 101 into parallel rays.

The mirror member 102 is disposed on the optical axis of the light source 101 so as to be inclined to the optical axis. For example, the mirror member 102 reflects light emitted from the light source 101 mostly in the positive y-axis direction.

The ED element 90 is disposed between the light source 101 and the mirror member 102 on the optical axis of the light source 101 so as to be inclined to the optical axis. For example, the ED element 90 in a mirror state reflects light emitted from the light source 101 mostly in the positive y-axis direction.

The ED element 90, light source 101, and mirror member 102 may be accommodated in a housing mechanism 104, for example. The housing mechanism 104 includes a light ejecting portion 104a. The light ejecting portion 104a may be made of a light transmitting resin to allow the light emitted from the light source 101 and then reflected by the ED element 90 or mirror member 102 to be ejected to the outside of the housing mechanism 104.

The members included in the vehicle lighting device 100 are not limited to the above-described ones. If needed, still another optical member may be disposed. For example, an optical member such as a projection lens 105 may be disposed outside the light ejecting portion 104a in the housing mechanism 104. The projection lens 105 reverses a light reflection pattern of each of the ED element 90 and the mirror member 102 and projects it in the positive y-axis direction (forward). If the projection lens 105 is disposed, the ED element 90 and the mirror member 102 are arranged such that they are reversed in the z-axis direction (up-and-down direction).

FIG. 2B is a schematic diagram that illustrates a placement state of the ED element 90 and the mirror member 102 (xz-plane).

The ED element 90 is disposed such that the first and second regions 30a and 30b are aligned in the z-axis direction. For example, the first region 30a may be disposed on the positive z-axis direction side, and the second region 30b may be disposed on the negative z-axis direction side.

The ED element 90 is disposed so as to reflect light travelling in the positive x-axis direction, in the positive y-axis direction (front direction) in a mirror state. The mirror member 102 is disposed so as to reflect light traveling in the positive x-axis direction, in a direction that is the positive y-axis direction (front direction) and that is slightly near the negative z-axis direction side (lower side).

Figure 3A:
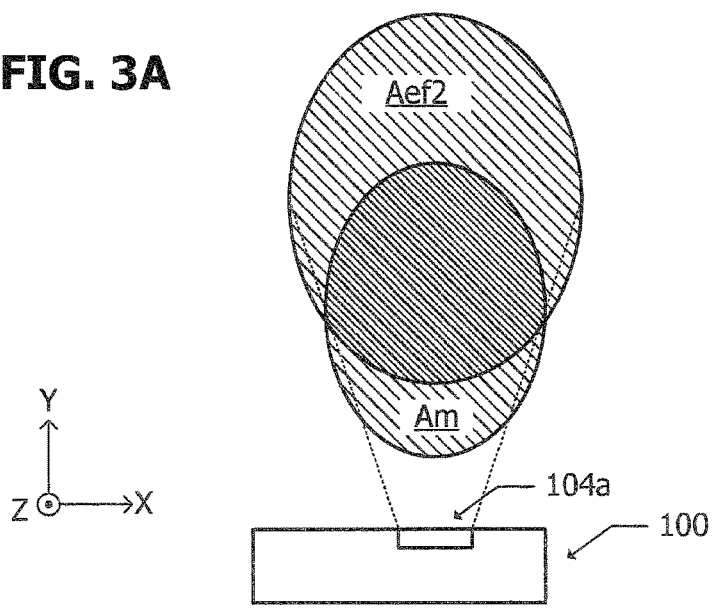
FIGS. 3A and 3B are schematic diagrams of light distribution states of the vehicle lighting device and illustrate a low-beam light distribution and a high-beam light distribution, respectively, in a front direction.
Figure 3B:
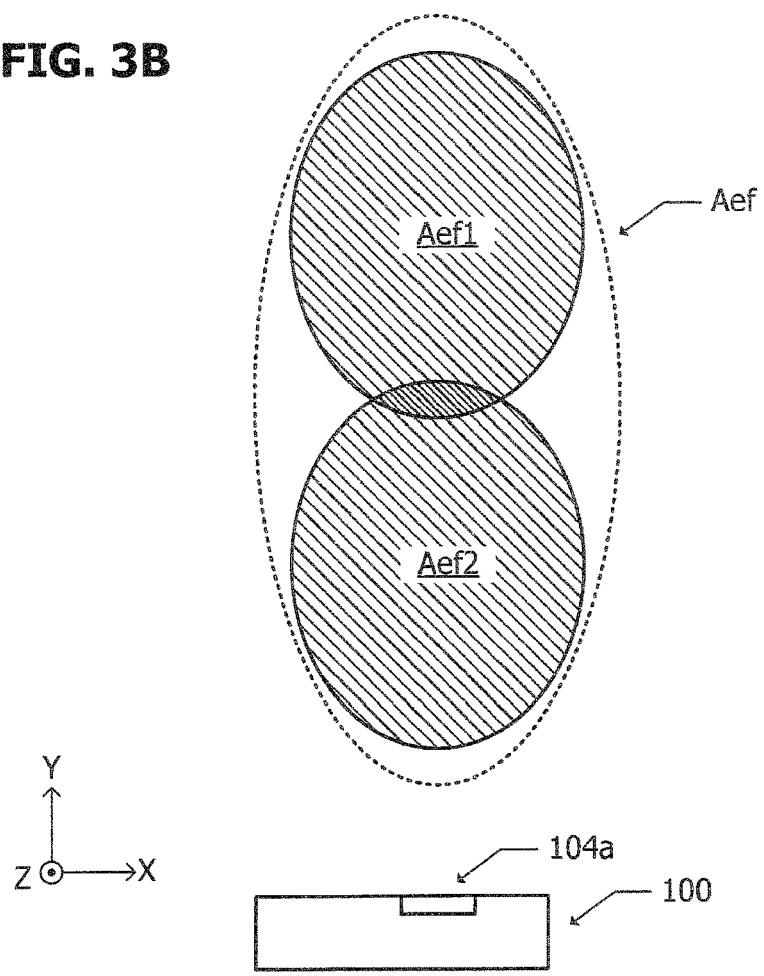

FIGS. 3A and 3B are schematic diagrams that illustrate light distribution control states of the vehicle lighting device 100 (xy-plane). A road surface parallel with the xy-plane (horizontal plane) is illuminated by light emitted from the vehicle lighting device 100. The fundamental functions of the vehicle lighting device 100 are described below with reference to FIGS. 2A and 2B as well as FIGS. 3A and 3B.

FIG. 3A illustrates a light distribution state when the second region 30b in the ED element 90 is in a mirror state in the vehicle lighting device 100. That is, FIG. 3A illustrates a light distribution state when a voltage is applied across the electrodes 12b and 22b in the ED element 90 (see FIGS. 1A and 1B).

Part of light emitted from the light source 101 passes through the first region 30a being in a transparent state in the ED element 90, is reflected by the mirror member 102, and is ejected from the housing mechanism 104 (light ejecting portion 104a). The light reflected by the mirror member 102 travels in a direction that is the positive y-axis direction (front direction) and that is slightly near the negative z-axis direction side (lower side), so that an area Am relatively near the vehicle lighting device 100 on a road surface is illuminated by that light.

Another part of light emitted from the light source 101 is reflected at the second region 30b being in a mirror state in the ED element 90 and is then ejected from the housing mechanism 104 (light ejecting portion 104a). The light reflected at the second region 30b in the ED element 90 travels in the positive y-axis direction (front direction). At this time, because the second region 30b in the ED element 90 is in a relatively low position in the ED element 90, that is, positioned on a negative z-axis direction side, the light reflected at the second region 30b in the ED element 90 reaches only an area Aef2 relatively near the vehicle lighting device 100 on the road surface.

The area relatively near the vehicle lighting device 100 is illuminated by both the light passing through the first region 30a being in a transparent state in the ED element 90 and then reflected by the mirror member 102 and the light reflected at the second region 30b being in a mirror state in the ED element 90. Accordingly, the vehicle lighting device 100 can illuminate the relatively near place more strongly. Such a light distribution state is generally called low-beam state. Here, for the sake of convenience, this light distribution state is referred to as low-beam light distribution in the front direction.

FIG. 3B illustrates a light distribution state when both the first and second regions 30a and 30b in the ED element 90 are in a mirror state in the vehicle lighting device 100. That is, FIG. 3B illustrates a light distribution state when a voltage is applied across the electrodes 12 and 22 (across the electrodes 12a and 22a and across the electrodes 12b and 22b) in the ED element (see FIGS. 1A and 1B). The ED element 90 functions as a mirror member (mirror) as a whole.

Light emitted from the light source 101 is reflected by the ED element 90 being in a mirror state as a whole and is then ejected from the housing mechanism 104 (light ejecting portion 104a). The light reflected by the ED element 90 travels in the positive y-axis direction (front direction).

At this time, because the first region 30a in the ED element 90 is in a relatively high position, that is, positioned on a positive z-axis direction side in the ED element 90, the light reflected at the first region 30a in the ED element 90 reaches up to an area Aef1 relatively remote from the vehicle lighting device 100 on the road surface. The second region 30b in the ED element 90 is in a relatively low position, that is, positioned on a negative z-axis direction side in the ED element 90. Thus the light reflected at the second region 30b in the ED element 90 reaches only the area Aef2, which is relatively near the vehicle lighting device 100 on the road surface.

A wide area Aef from the area near the vehicle lighting device 100 to the area remote therefrom is illuminated by the light reflected by the ED element 90 as a whole. Accordingly, the vehicle lighting device 100 can illuminate up to the more remote place strongly. Such a light distribution state is generally called high-beam state. Here, for the sake of convenience, this light distribution state is referred to as high-beam light distribution in the front direction.

As described above, the use of the ED element in the vehicle lighting device enables switching between the low-beam light distribution and high-beam light distribution in the front direction by only electrical control without mechanically controlling the optical member. This may contribute to reduction in size and weight and improvement in reliability of the vehicle lighting device.

Figure 4A:
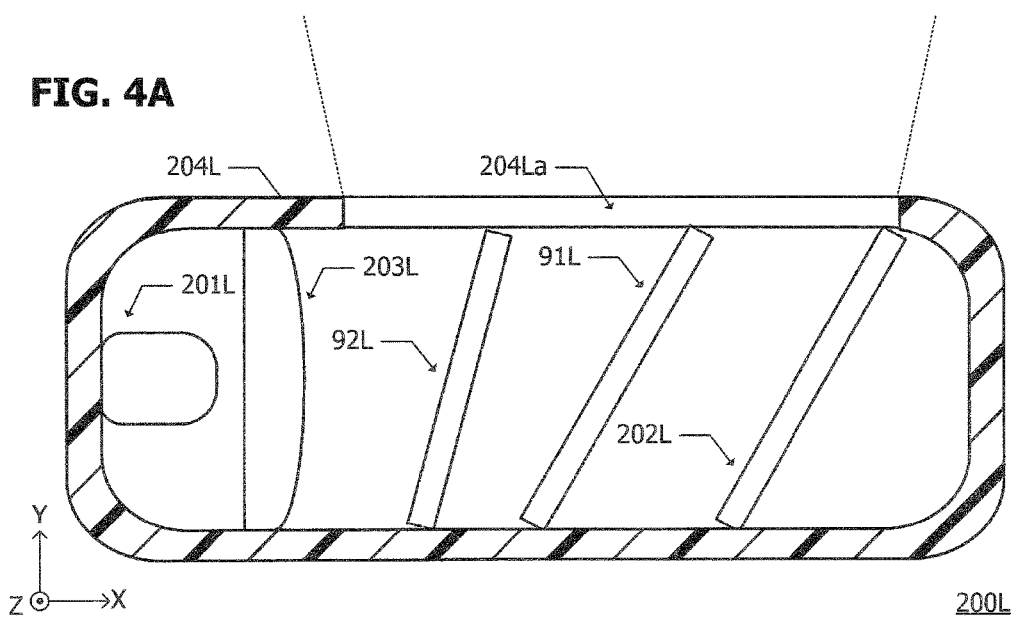
FIG. 4A is a schematic diagram that illustrates a basic structure of a vehicle lighting device including two electrodeposition elements.

FIG. 4A is a schematic diagram that illustrates the structure of a vehicle lighting device according to a second embodiment (xy-plane). A vehicle lighting device 200L mainly includes first and second ED elements 91L and 92L, a light source 201L, and a mirror member 202L.

The vehicle lighting device 200L basically has substantially the same structure as that of the vehicle lighting device 100 in the first embodiment, except for the second ED element 92L. That is, in addition to the light source 201L and the mirror member 202L, a projection lens 203L and housing mechanism 204L (light ejecting portion 204La) are included in the vehicle lighting device 200L. The light source 201L, mirror member 202L, projection lens 203L, and housing mechanism 204L (light ejecting portion 204La) correspond to the light source 101, mirror member 102, projection lens 103, and housing mechanism 104 (light ejecting portion 104a), respectively, in the light source 101 according to the first embodiment. The first ED element 91L corresponds to the ED element 90 in the vehicle lighting device 100 according to the first embodiment.

The second ED element 92L has substantially the same structure as that of the ED element 90 illustrated in FIG. 1 and is disposed on the optical axis of the light source 201L between the light source 201L and the first ED element 91L so as to be inclined to the optical axis. The angle of inclination of the second ED element 92L to the optical axis of the light source 201L is more acute than that of the first ED element 91L.

Figure 4B:
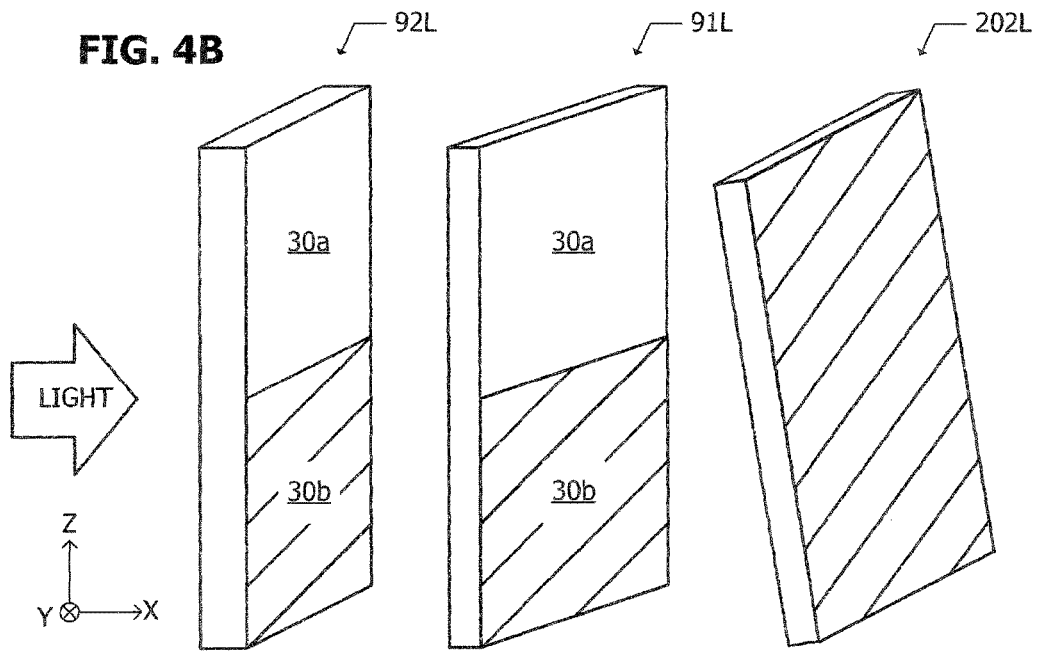
FIG. 4B is a schematic diagram that illustrates a placement state of the electrodeposition elements and so forth.

FIG. 4B is a semiconductor device that illustrates a placement state of, in particular, the second ED element 92L (xz-plane). The second ED element 92L is disposed such that the first and second regions 30a and 30b are aligned in the z-axis direction, as in the first ED element 91L. That is, the first region 30a is disposed on the positive z-axis direction side, and the second region 30b may be disposed on the negative z-axis direction side.

The second ED element 92L is inclined at an angle to the optical axis of the light source 201L more acute than that of the first ED element 91L. The second ED element 92L is disposed so as to reflect light traveling in the positive x-axis direction, in a direction that is slightly near the negative x-axis direction side (left side) with reference to the positive y-axis direction (front direction) in a mirror state.

Figure 4C:
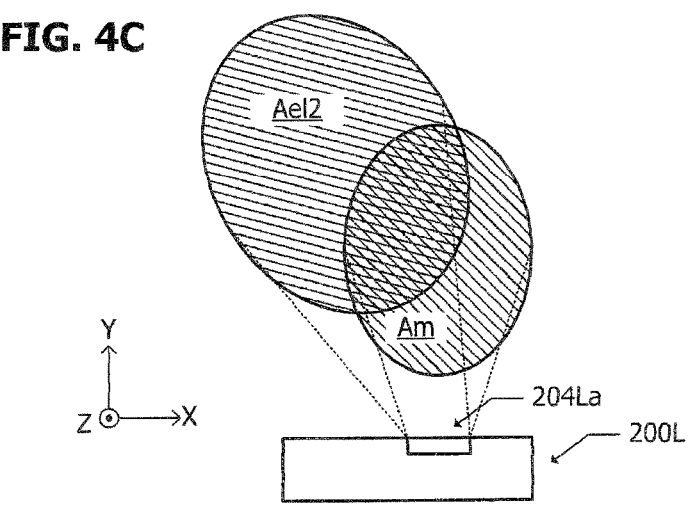
FIG. 4C is a schematic diagram of a light distribution state of the vehicle lighting device and illustrates a low-beam light distribution in a left direction.

FIG. 4C is a schematic diagram that illustrates a light distribution control state of the vehicle lighting device 200L (xy-plane). A road surface parallel with the xy-plane (horizontal plane) is illuminated by light emitted from the vehicle lighting device 200L. The fundamental functions of the vehicle lighting device 200L are described below with reference to FIGS. 4A and 4B as well as FIG. 4C.

The vehicle lighting device 200L functions in substantially the same way as that in the vehicle lighting device 100 according to the first embodiment when the second ED element 92L is in a transparent state as a whole. That is, when the first region is in a transparent state and the second region is in a mirror state in the first ED element 91L, the low-beam light distribution in the front direction is achieved; when both the first and second regions are in a mirror state, the high-beam light distribution in the front direction is achieved.

A case where the second region in the second ED element 92L is in a mirror state when the first region is in a transparent state and the second region is in a mirror state in the first ED element 91L is discussed. In this case, part of light emitted from the light source 201L is reflected at the second region being in the mirror state in the second ED element 92L and is then ejected from the housing mechanism 204L (light ejecting portion 204La). As illustrated in FIG. 4C, the light reflected at the second region in the second ED element 92L travels from the positive y-axis direction (front direction) toward the negative x-axis direction side (left side) so that the area Ael2 relatively near the vehicle lighting device 200L on the road surface is illuminated by that light.

Part of light emitted from the light source 201L passes through the first region being in a transparent state in the second ED element 92L and the first region in the first ED element 91L, is reflected by the mirror member 202L, and is ejected from the housing mechanism 204L (light ejecting portion 204La). The light reflected by the mirror member 202L travels in a direction that is the positive y-axis direction (front direction) and that is slightly near the negative z-axis direction (lower side) so that the area Am relatively near the vehicle lighting device 200L on the road surface is illuminated by that light.

A place that is on a forward left side and that is relatively near the vehicle lighting device 200L is illuminated by the light reflected by the mirror member 202L and the light reflected at the second region being in a mirror state in the second ED element 92L as a whole. In this way, the vehicle lighting device 200L can switch the light distribution direction from the front direction to the left direction in a low-beam state. For the sake of convenience, this light distribution state is referred to as low-beam light distribution in the left direction.

A case where both the first and second regions in the second ED element 92L are in a mirror state when the first region is in a transparent state and the second region is in a mirror state in the first ED element 91L is discussed. In this case, light emitted from the light source 201L is reflected by the second ED element 92L being in a mirror state as a whole and is then ejected from the housing mechanism 204L (light ejecting portion 204La). The light reflected by the second ED element 92L travels from the positive y-axis direction (front direction) toward the negative x-axis direction side (left side) so that a wide area from the area near the vehicle lighting device 200L to the area remote therefrom on the road surface is illuminated by that light.

A place that is on a forward left side of the vehicle lighting device 200L and that is relatively remote therefrom is illuminated by the light reflected by the second ED element 92L being in a mirror state as a whole. In this way, the vehicle lighting device 200L can switch the light distribution direction from the front direction to the left direction in a high-beam state. For the sake of convenience, this light distribution state is referred to as high-beam light distribution in the left direction.

As described above, the use of the two ED elements in the vehicle lighting device enables switching the light distribution direction between the front direction and a direction from the front direction to the left direction. Three or more ED elements may also be used. The use of three or more ED elements inclined at different angles to the optical axis of the light source will enable switching the light distribution direction among more directions.

Figure 5A:
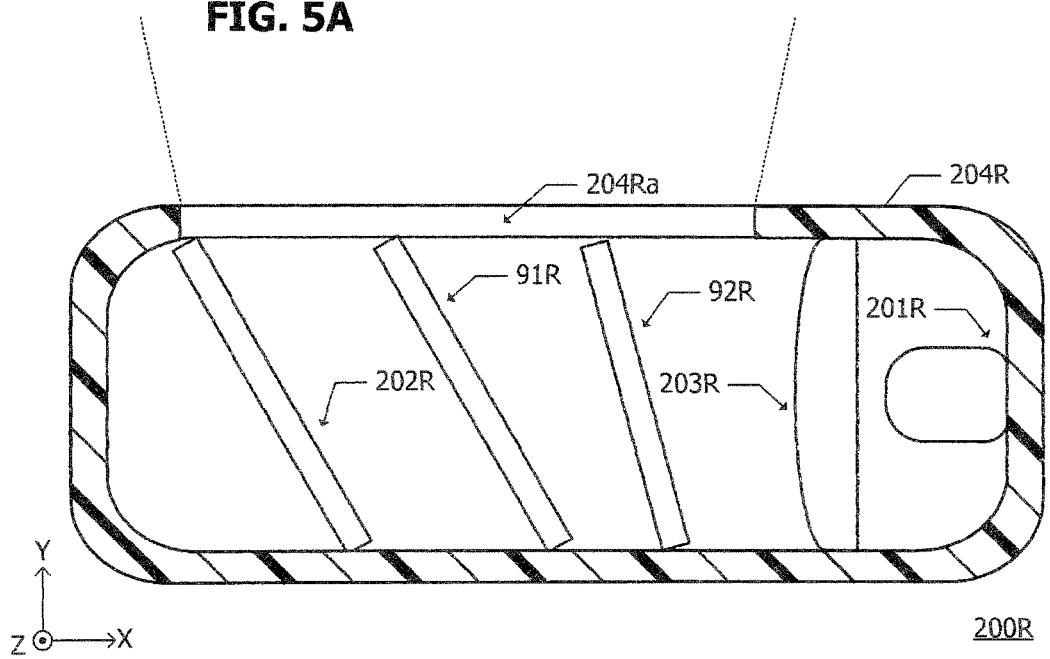
FIG. 5A is a schematic diagram that illustrates a basic structure of a vehicle lighting device including two electrodeposition elements.

FIG. 5A is a schematic diagram that illustrates a variation of the vehicle lighting device according to the second embodiment (xy-plane). A vehicle lighting device 200R has a structure in which the components in the vehicle lighting device 200L are reversed with reference the yz-plane as a plane of symmetry.

The vehicle lighting device 200R basically includes substantially the same components as those in the vehicle lighting device 200L and includes first and second ED elements 91R and 92R, a light source 201R, a mirror member 202R, a projection lens 203R, and a housing mechanism 204R (light ejecting portion 204Ra). As illustrated in FIG. 5A, the mirror member 202R, first and second ED elements 91R and 92R, and light source 201R are arranged in sequence toward the positive x-axis direction in the vehicle lighting device 200R. The light source 201R emits visible light (white light) in the negative x-axis direction.

The mirror member 202R is disposed on the optical axis of the light source 201R so as to be inclined to the optical axis. For example, the mirror member 202R reflects light emitted from the light source 201R in a direction that is the positive y-axis direction (front direction) and that is slightly near the negative z-axis direction side (lower side).

The first ED element 91R is disposed on the optical axis of the light source 201R between the light source 201R and the mirror member 202R so as to be inclined to the optical axis. For example, the first ED element 91R is disposed so as to reflect light emitted from the light source 201R mostly in the positive y-axis direction (front direction in a mirror state. In the first ED element 91R, the first region is disposed on the positive z-axis direction side, and the second region is disposed on the negative z-axis direction side.

The second ED element 92R is disposed between the light source 201R and the first ED element 91R on the optical axis of the light source 201R so as to be inclined to the optical axis. For example, the second ED element 92R is disposed so as to reflect light emitted from the light source 201R in a direction that is slightly near the positive x-axis direction side (right side) with reference to the positive y-axis direction (front direction). In the second ED element 92R, the first region is disposed on the positive z-axis direction side, and the second region is disposed on the negative z-axis direction side.

Figure 5B:
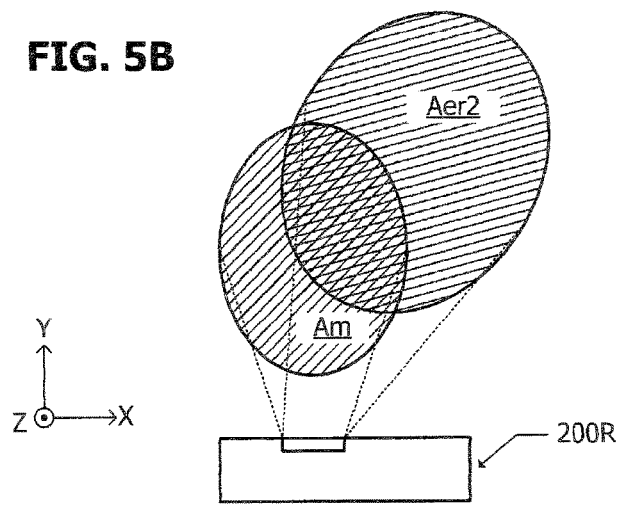
FIG. 5B is a schematic diagram of a light distribution state of the vehicle lighting device and illustrates a low-beam light distribution in a right direction.

FIG. 5B is a schematic diagram that illustrates a light distribution control state of the vehicle lighting device 200R (xy-plane). The vehicle lighting device 200R basically functions in substantially the same way as that in the vehicle lighting device 200L.

A case where the second ED element 92R is in a transparent state as a whole is discussed. In this case, when the first region is in a transparent state and the second region is in a mirror state in the first ED element 91R, the vehicle lighting device 200R achieves the low-beam light distribution in the front direction. When both the first and second regions are in a mirror state, the vehicle lighting device 200R achieves the high-beam light distribution in the front direction.

A case where the second region in the second ED element 92R is in a mirror state when the first region is in a transparent state and the second region is in a mirror state in the first ED element 91R is discussed. In this case, as illustrated in FIG. 5B, a place that is on a forward right side of the vehicle lighting device 200R and that is relatively near the vehicle lighting device 200R (light illumination area Am corresponding to reflection by the mirror member 202R and light illumination area Aer2 corresponding to reflection at the second region in the second ED element 92R) is illuminated by the light reflected by the mirror member 202R and the light reflected at the second region in a mirror state in the second ED element 92R as a whole. In this way, the vehicle lighting device 200R can switch the light distribution direction from the front direction to the right direction in a low-beam state. For the sake of convenience, this light distribution state is referred to as low-beam light distribution in the right direction.

A case where both the first and second regions in the second ED element 92R are in a mirror state when the first region is in a transparent state and the second region is in a mirror state in the first ED element 91R is discussed. In this case, a place that is on a forward right side of the vehicle lighting device 200R and that is relatively remote therefrom is illuminated by the light reflected by the second ED element 92R being in a mirror state as a whole. In this way, the vehicle lighting device 200R can switch the light distribution direction from the front direction to the right direction. For the sake of convenience, this light distribution state is referred to as high-beam light distribution in the right direction.

Figure 6A:
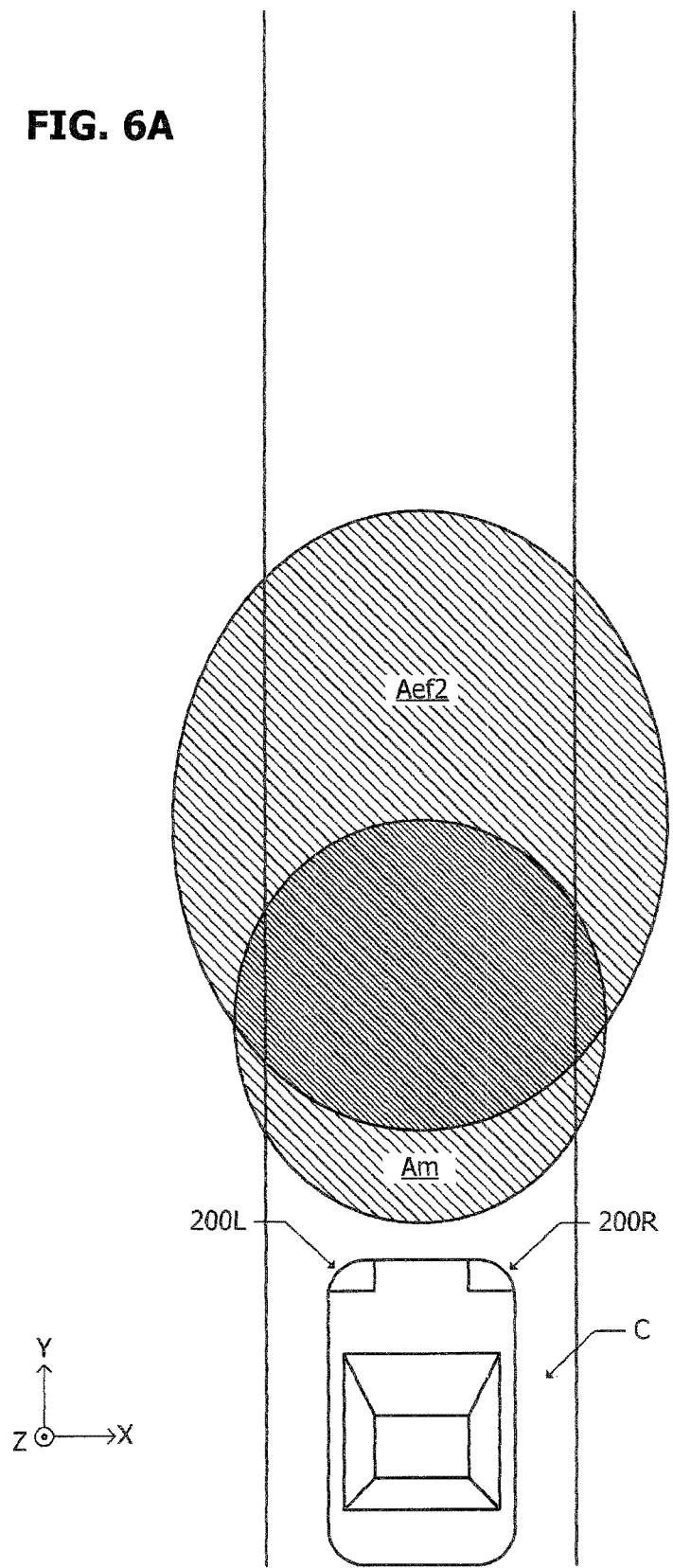
Figure 6C:
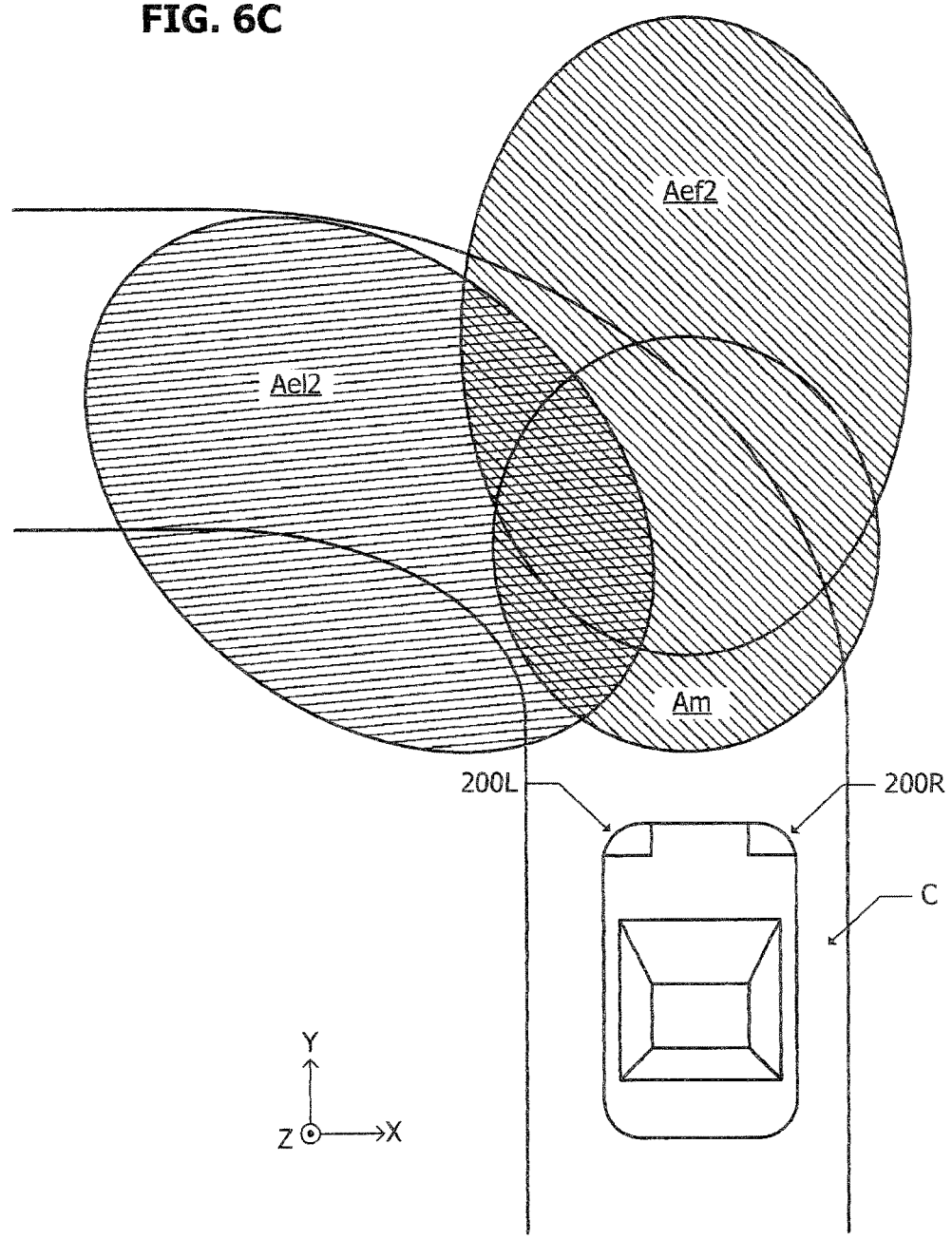

FIGS. 6A to 6C are schematic diagrams that illustrate light distribution control states of a headlight including the vehicle lighting devices 200L and 200R (xy-plane). A headlight capable of emitting light in the front direction and in a direction from the front direction toward the left side and right side can be formed by combination of the vehicle lighting devices 200L and 200R illustrated in FIGS. 4A and 5A. The vehicle lighting devices 200L and 200R are mounted on the left and right sides, respectively, on the front of a vehicle C.

The fundamental functions of the headlight including the vehicle lighting devices 200L and 200R are described below with reference to FIGS. 4A and 5A as well as FIGS. 6A to 6C. The vehicle lighting devices 200L and 200R are newly referred to as left-side headlight 200L and right-side headlight 200R.

As illustrated in FIG. 6A, when the left-side and right-side headlights 200L and 200R operate in the low-beam light distribution in the front direction, they can illuminate a place relatively near the vehicle C more strongly. In this light distribution state, a driver of the vehicle C can drive it with good visibility without dazzling a driver of a vehicle running ahead.

In the drawings, an area illuminated by light reflected by the mirror members 202L and 202R in the left-side and right-side headlights 200L and 200R is indicated as the area Am. An area illuminated by light reflected by (the second regions in both) the first ED elements 91L and 91R is indicated as the area Aef2.

As illustrated in FIG. 6B, when the left-side and right-side headlights 200L and 200R operate in the high-beam light distribution in the front direction, they can illuminate a place relatively remote from the vehicle C. In this light distribution state, the driver of the vehicle C can drive it with good visibility while viewing a more remote area in cases where no vehicle is ahead, no oncoming vehicle is present, or other cases. An area illuminated by light reflected by (the first and second regions in both) the first ED elements 91L and 91R in the left-side and right-side headlights 200L and 200R is indicated as the area Aef.

As illustrated in FIG. 6C, when the left-side headlight 200L operates in the low-beam light distribution in the left direction and the right-side headlight 200R operates in the low-beam light distribution in the front direction, they can illuminate places relatively near the vehicle C and in the front and from the front toward the left side. In this light distribution state, the driver of the vehicle C can drive it with good visibility while checking safety in the direction of travel in a left turn or other cases.

In the drawings, an area illuminated by light reflected by the mirror members 202L and 202R in the left-side and right-side headlights 200L and 200R is indicated as the area Am. An area illuminated by light reflected by (the second region in) the second ED element 92L in the left-side headlight 200L is indicated as the area Ael2. An area illuminated by light reflected by (the second region in) the first ED element 91R in the right-side headlight 200R is indicated as the area Aef2.

Controlling the left-side and right-side headlights 200L and 200R, in addition to the light distribution states, enables various places, such as a more remote place or a place from the front to the right side, to be illuminated. This light distribution control method is commonly known as adaptive front-lighting system (AFS).

The shape of each of the first and second regions in the ED element is not limited to the one illustrated in FIG. 1B. Other shapes may also be used. For example, each of the first and second regions may be further divided into a plurality of sub-regions. The first and second regions may have different shapes.

Figure 7A:
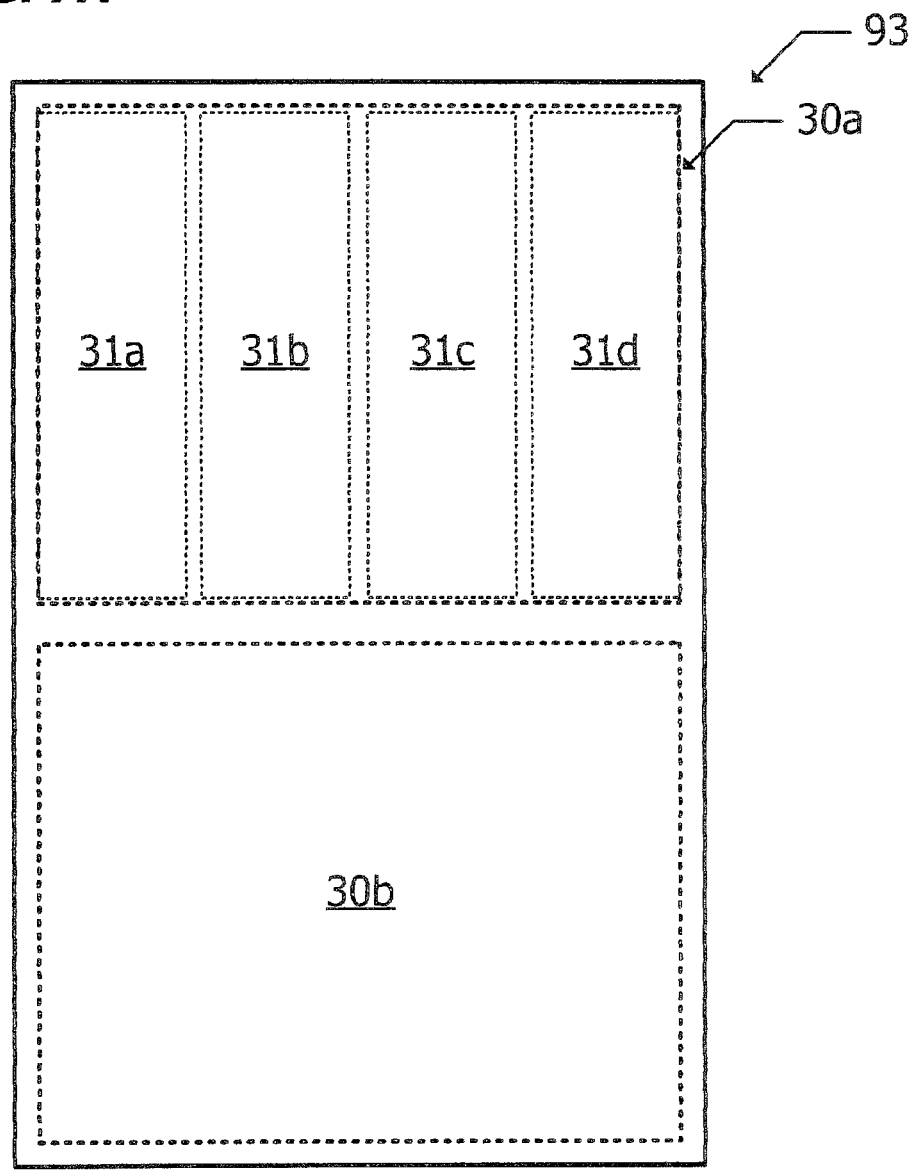
FIG. 7A is a plan view that illustrates an electrodeposition element according to a variation.

FIG. 7A is a plan view that illustrates an ED element 93 as a first variation of the ED element 90. The ED element 93 as the first variation has a structure in which the first region 30a in the ED element 90 is further divided into a plurality of sub-regions 31a to 31d. That is, each of the electrodes 12a and 22a (see FIG. 1A) defining the first region is divided into a plurality of patterns separated from each other.

The sub-regions 31a to 31d can be allowed to be independently switched between a transparent state and a mirror state. The ED element 93 may be used in each of the left-side and right-side headlights 200L and 200R.

FIG. 7B is a schematic diagram that illustrates a light distribution control state of headlights (300L and 300R) each using the ED element 93 according to the variation (xy-plane). The headlights 300L and 300R have a structure in which all the first and second ED elements (see FIGS. 4A and 5A) in the headlights 200L and 200R are replaced with the ED elements 93 according to the variation. In an initial state, each of the left-side and right-side headlights 300L and 300R operates in the low-beam light distribution in the front direction.

In this state, when the sub-regions 31a to 31d in the second ED element (ED element 93 nearer the light source) in the left-side headlight 300L are in a mirror state, areas Aela to Aeld that are in a direction from the front direction to the left direction and that are more remote from the vehicle can be illuminated by light. When the sub-regions 31a to 31d in the first ED element (ED element 93 disposed between the second ED element and the mirror member) in the left-side headlight 300L are in a mirror state, areas Aefa to Aefd that are in the front direction and that are more remote from the vehicle can be illuminated by light.

In addition, when the sub-regions 31a to 31d in the second ED element (ED element 93 nearer the light source) in the right-side headlight 300R are in a mirror state, areas Aerd to Aera that are in a direction from the front direction to the right direction and that are more remote from the vehicle can be illuminated by light. When the sub-regions 31a to 31d in the first ED element (ED element 93 disposed between the second ED element and the mirror member) in the right-side headlight 300R are in a mirror state, the areas Aefd to Aefa, which are in the front direction and are more remote from the vehicle, can be illuminated by light.

In this way, the use of the ED element having the subdivided first region enables illuminating a remote place more specifically. For example, the driver of the vehicle C can drive it with better visibility without dazzling a driver of a vehicle running ahead by achieving illumination of more remote areas (areas Aefa and Aefd) without illuminating the vehicle running ahead. The driver of the vehicle C can also drive it while paying caution in particular to a pedestrian or other people who is running out into the street by illumination of only both end areas (illumination of the areas Aela and Aerd). This light distribution control method is commonly known as adaptive driving beam (ADB).

Figure 8A:
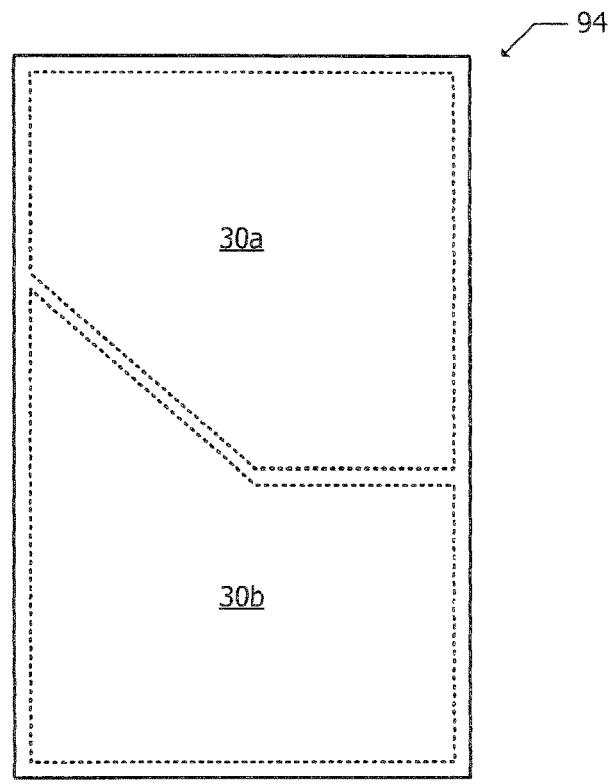
FIGS. 8A and 8B are plan views that illustrate electrodeposition elements according to other variations.

FIG. 8A is a plan view that illustrates an ED element 94 as a second variation of the ED element 90. The second region 30b in the ED element 94 has a shape that projects toward the first region 30a on one end side. The first region 30a has a shape that is recessed on one end side to match with the shape of the second region 30b. The use of the ED element 94 in a headlight enables a light illumination area in the low-beam light distribution to have a cut-off shape. The first region 30a in the ED element 94 in the second variation may be divided into a plurality of sub-regions, as illustrated in FIG. 7A.

Figure 8B:
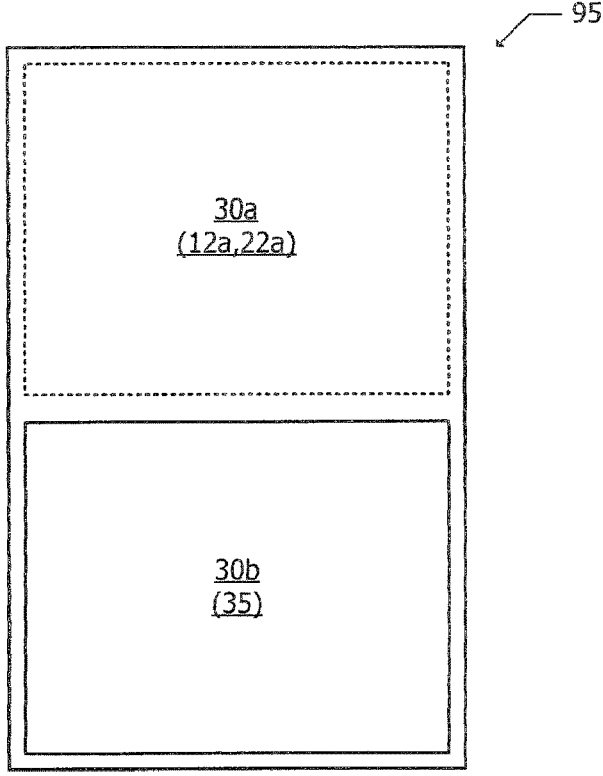

FIG. 8B is a plan view that illustrates an ED element 95 as a third variation of the ED element 90. In terms of fail-safe operation, the second region in the first ED element is preferably in a mirror state at all times in each of the headlights 200L and 200R (see FIGS. 4A and 5B). Thus, the ED element 95 including another member 35 having light reflectivity and made of, for example, silver or aluminum in a region corresponding to the second region 30b may be used in the first ED element in each of the headlights 200L and 200R. An ED element using a member having light reflectivity (e.g., silver or aluminum) may be used in the electrodes 12b and 22b (see FIGS. 1A and 1B), instead of a light-transmitting member (e.g., ITO). The first region 30a in the ED element 95 in the third variation may be divided into a plurality of sub-regions, as illustrated in FIG. 7A.

The embodiments in the present invention are described above, and the present invention is not limited to these embodiments. For example, the headlight may be formed by using the vehicle lighting device according to the first embodiment (FIG. 2A). That is, the vehicle lighting device 100 illustrated in FIG. 2A may be used as the left-side headlight, and a vehicle lighting device in which the left and right configuration of the vehicle lighting device 100 is reversed may be used as the right-side headlight. If needed, another optical member may be disposed. Other changes, modifications, combinations will be apparent to persons skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What are claimed are:

1. A vehicle lighting device comprising:
   a light source for emitting light in a predetermined direction;
   a mirror member disposed on an optical axis of the light source so as to be inclined to the optical axis; and
   a electrodeposition element disposed on the optical axis of the light source between the light source and the mirror member so as to be inclined to the optical axis, the electrodeposition element including a first region that is switchable between a light transmitting state and a light reflecting state and a second region being in at least a light reflecting state;
   wherein:
   the electrodeposition element comprises:
      first and second transparent substrates facing each other;
      a first transparent electrode on a surface of the first transparent substrate, the surface of the first transparent substrate facing the second transparent substrate;
      a second transparent electrode on a surface of the second transparent substrate, the surface of the second transparent substrate facing the first transparent substrate; and
      an electrolyte layer which fills a gap between the first and second transparent substrates, the electrolyte layer containing an electrodeposition material including silver;
   when the first region in the electrodeposition element is in the light reflecting state, the first region in the electrodeposition element reflects part of the light emitted from the light source to a relatively remote place;
   when the first region in the electrodeposition element is in the light transmitting state, the mirror member reflects the light that is emitted from the light source and then passes through the first region in the electrodeposition element to a relatively near place; and
   the second region in the electrodeposition element reflects part of the light emitted from the light source to a relatively near place.

2. The vehicle lighting device according to claim 1, wherein each of the first and second regions in the electrodeposition element is switchable between the light transmitting state and the light reflecting state.

3. The vehicle lighting device according to claim 2, wherein the first region in the electrodeposition element includes a plurality of sub-regions each of which is switchable between the light transmitting state and the light reflecting state.

4. The vehicle lighting device according to amended claim 3, wherein a width of each of the sub-regions is smaller than a width of the second region.

5. The vehicle lighting device according to claim 1, wherein in the electrodeposition element, the first region is switchable between the light transmitting state and the light reflecting state, and the second region is always in the light reflecting state.

6. The vehicle lighting device according to claim 5, wherein the first region in the electrodeposition element includes a plurality of sub-regions each of which is switchable between the light transmitting state and the light reflecting state.

7. The vehicle lighting device according to amended claim 6, wherein a width of each of the sub-regions is smaller than a width of the second region.

8. The vehicle lighting device according to claim 1, further comprising an optical element disposed on the optical axis of the light source between the light source and the electrodeposition element so as to be inclined to the optical axis at an angle different from an angle of the inclination of the electrodeposition element, the optical element including a region that is switchable between the light transmitting state and the light reflecting state.

9. The vehicle lighting device according to amended claim 1, wherein:
   when a voltage is not applied between the first and second transparent electrodes, the electrolyte layer is in a transparent state so that the electrodeposition element is in the light transmitting state; and
   when a voltage is applied between the first and second transparent electrodes, the electrodeposition material in the electrolyte layer attaches to one of the first and second transparent electrodes and constitutes a mirror layer so that the electrodeposition element is in the light reflecting state.

10. The vehicle lighting device according to amended claim 1, wherein the electrodeposition material comprises at least one material selected from the group consisting of $AgNO_3$, $AgCl_4$ and $AgBr$.

11. The vehicle lighting device according to amended claim 10, wherein the electrolyte layer further comprises a solvent which supports electrolyte and mediator.

12. The vehicle lighting device according to amended claim 1, wherein the electrolyte layer further comprises a solvent which supports electrolyte and mediator.

* * * * *